H. H. KRYGER.
SICKLE DRIVE FOR HARVESTERS.
APPLICATION FILED MAR. 31, 1906.
925,352.
Patented June 15, 1909.
2 SHEETS—SHEET 2.
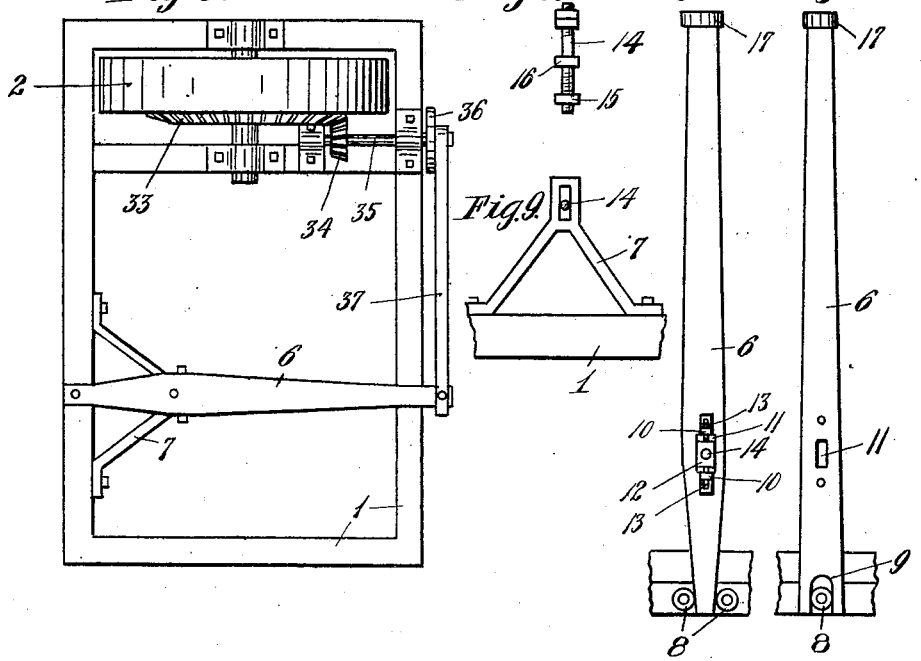
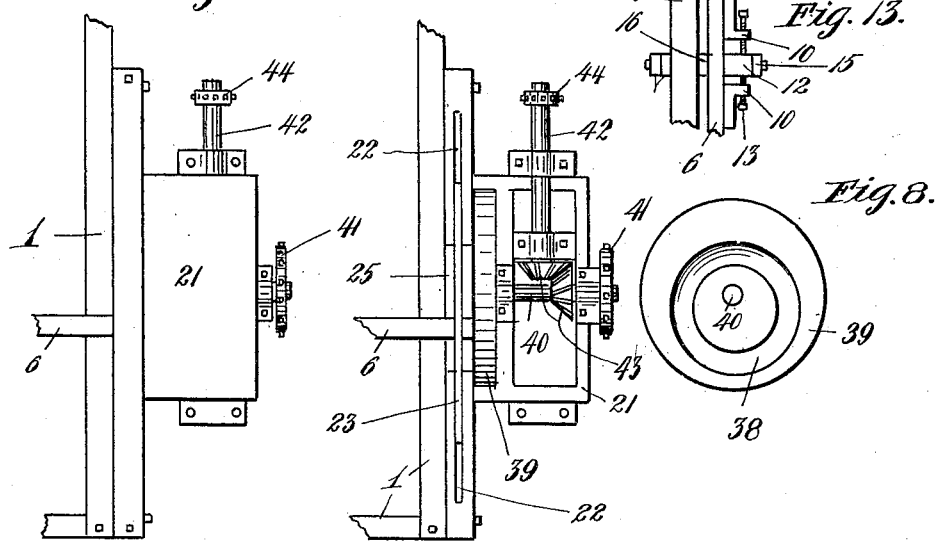
Witnesses:
Inventor;
H. H. Kryger.
By his Attorneys.

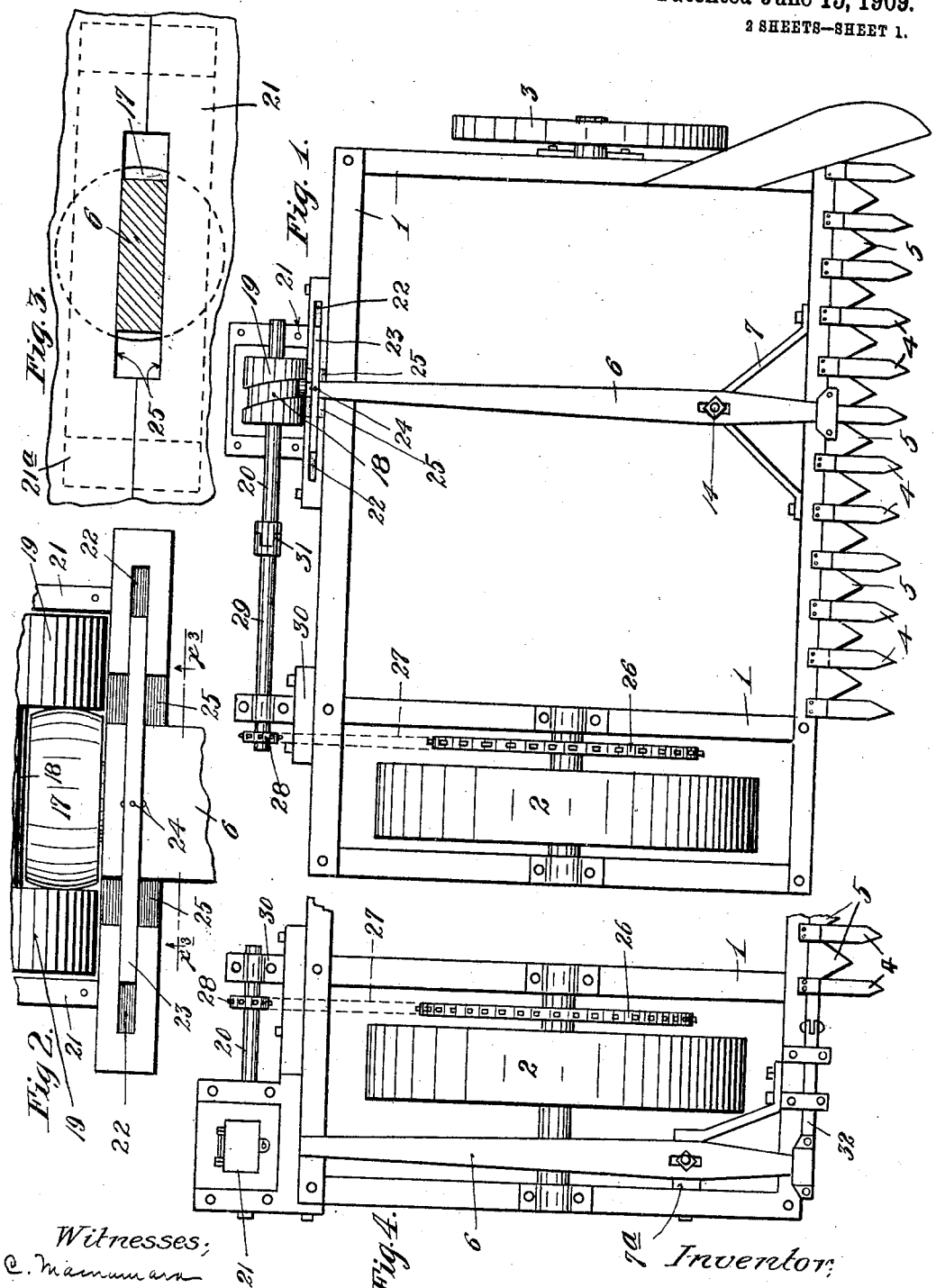

UNITED STATES PATENT OFFICE.

HENRY H. KRYGER, OF MINNEAPOLIS, MINNESOTA.

SICKLE-DRIVE FOR HARVESTERS.

No. 925,352.  Specification of Letters Patent.  Patented June 15, 1909.

Application filed March 31, 1906. Serial No. 309,065.

*To all whom it may concern:*

Be it known that I, HENRY H. KRYGER, a citizen of the United States, residing at Minneapolis, in the county of Hennepin and State of Minnesota, have invented certain new and useful Improvements in Sickle-Drives for Harvesters; and I do hereby declare the following to be a full, clear, and exact description of the invention, such as will enable others skilled in the art to which it appertains to make and use the same.

My invention relates to harvesters and other grain or grass cutting machines, and has for its special object to provide an improved sickle drive therefor.

To the above end the invention consists in the novel devices and combinations of devices hereinafter described and defined in the claims.

In the accompanying drawings which illustrate the invention, like characters indicate like parts throughout the several views.

Referring to the drawings, Figure 1 is a plan view with some parts removed showing a harvester and illustrating my improved sickle drive applied thereto. Fig. 2 is a detail in plan showing a portion of the sickle operating lever and cam for actuating the same. Fig. 3 is a section taken on the line $x^3$ $x^3$ of Fig. 2, some parts being broken away. Fig. 4 is a view corresponding to Fig. 1, but illustrating a slightly modified arrangement of the sickle drive, some parts of the harvester frame being broken away. Fig. 5 is a plan view corresponding to Fig. 1, but illustrating a still further modification of the sickle drive. Fig. 6 is a plan view of the parts shown in Fig. 7. Fig. 7 is a plan view with some parts removed illustrating a still further modification of the sickle drive. Fig. 8 is a face elevation of the cam used in Figs. 6 and 7. Fig. 9 is a detail in plan showing a bracket for supporting the sickle operating lever. Fig. 10 is a bolt for adjustably connecting the lever to the bracket shown in Fig. 9. Figs. 11 and 12 are details in plan showing the sickle operating lever and associated parts, and Fig. 13 is a detail view in elevation showing the adjustable fulcrum connection between the lever and bracket shown in Figs. 9 and 11.

1 indicates the frame, 2 the traction wheel (frequently termed the "bull wheel"), and 3 the grain wheel of a harvester of the usual construction. The front bar of the frame 1 is utilized as a finger bar, and the fingers 4 are shown applied thereto. The sickle 5 works in suitable seats afforded by the several fingers 4. So far as this invention is concerned the sickle bar 5 and fingers 4 may be of any suitable construction, but in practice I would prefer to use the novel sickle bar and fingers disclosed and claimed in a companion application filed by me of even date herewith, and entitled "Cutting mechanism for harvesters and similar machines".

We will now consider particularly the construction illustrated in Figs. 1, 2, 3, 9, 10, 11 and 13. A sickle-operating lever 6 of the first class is pivotally connected or fulcrumed to a suitable support, such as a bracket 7, that is rigidly secured to the front bar of the frame 1. The forward and short end of this lever 6 is connected to the intermediate portion of the sickle 5. As shown in Fig. 11, this connection to the sickle is made by projecting the end of said lever between rollers 8 on the sickle 5. It may, however, be done as shown in Fig. 12, by providing the end of said lever with a crotch 9 arranged to embrace a single roller 8 on the sickle. As shown, the lever 6 is adjustably fulcrumed to the bracket 7, and to this end is provided with longitudinally spaced lugs 10 and a slot 11. A fulcrum block 12 works in the slot 11 and is adjustably secured between the lugs 10, by opposing set-screws 13 that work through said lugs. This fulcrum block 12 is pivotally mounted on a stud 14 that is supported by and secured to said bracket 7. As shown, the bolt 14 projects through a slot in the bracket 7, and is adapted to be clamped thereto by a nut 15 that draws a collar 16 of said bolt against the top of said bracket. This makes the bolt 14 adjustable from the front toward the rear of the machine, and vice versa. At its rear end the lever 6 is provided with a roller 17 that works in the peripheral cam groove 18 of a cam 19, which cam 19 is carried by a shaft 20 mounted in suitable bearings formed in a case-like support 21, which in turn is rigidly secured to the rear bar of the harvester frame 1. In the inner flanged portion of the casing 21 is a longitudinal slot 22, in which freely reciprocates the slide 23. The rear end of the lever 6 works freely through a slot in the slide 23, and is connected thereto by a slot and pin coupling 24. The flanged portion of the casing 21 is notched or cut away at 25, to afford clearance for the rear end of the lever 6, when it is vibrated, by the cam 19. The slide 23 acts as a cross head or guide for the long rear end of the lever 6. The casing 21 is preferably formed with a detachable upper section 21ª, which when applied in working position, as shown in Fig. 3, holds the slide 23 and the cam 19 and the shaft 20 in working position. The traction or drive wheel 2 carries a large driving sprocket 26. A sprocket chain 27 runs over this sprocket 26 and over a small sprocket 28 carried by a shaft 29, which shaft is mounted in a suitable bearing 30 in the rear portion of the frame 1, and is, as shown, connected to the cam shaft 20 by an interlocking coupling 31 of the usual or any suitable construction.

With the construction described it is evident that under the forward movement of the machine rotary motion will be imparted to the cam 19, and a vibratory motion will be imparted by said cam to the lever 6, and through said lever 6 to the sickle. The lever 6 is fulcrumed or pivoted at a point which is much nearer to its forward than to its rearward end, the arrangement being preferably such that the power transmitted through said lever is multiplied about three times. By this arrangement great cutting power is obtained.

In the construction illustrated in Fig. 4 the lever 6 is fulcrumed on a support 7ª that is located outward of the traction wheel 2; or, in other words, on the right hand side of said traction wheel, direction being taken with respect to a driver seated on the machine. The connection between the forward end of said lever 6 and the adjacent end of the sickle is here made through a short pitman 32. The cam for operating the lever 6 is the same as that shown in Fig. 1, but its shaft 20 is in this instance mounted in suitable bearings at the rear of the traction wheel, and the sprocket 28 in the direction applied to said shaft 20.

In the construction illustrated in Fig. 5, the traction wheel 2 carries a large bevel gear 33 that meshes with a bevel pinion 34 carried by a shaft 35 mounted in suitable bearings in the frame 1, and provided at its rear end with a crank disk 36, the crank pin of which disk is directly connected to the rear end of the lever 6 by a pitman 37.

Figs. 6 and 7 illustrate a construction in which the rear end of the lever 6 works in an eccentric cam groove 38 of a profile cam 39, which cam is carried by a shaft 40 that is suitably mounted in the casing 21. As shown, this shaft 40 carries a sprocket 41, and is connected to a short counter-shaft 42 by miter gears 43. Also as shown, the shaft 42 carries a sprocket 44. With this arrangement the shaft 40 and cam 39 may be driven by a sprocket chain arranged to run over either of the two sprockets 41 or 44.

The improved sickle drive above described is of small cost, has few parts to get out of order, and is efficient for the purposes had in view. This improved sickle drive, which is shown as applied to a harvester, is of course adapted for application to a mower. The arrangement of the drive shown in Fig. 4 is probably the best arrangement for a mower.

I claim as my invention:

1. In a machine of the kind described, the combination with a finger equipped bar and a sickle, of a lever connected to said sickle at one end, a cross head or slide loosely connected to the other end of said lever, a bearing for said cross head or slide constructed to entirely inclose said cross head or slide, provided with a slot permitting vibratory movements of said lever, a cam operative on the rear end of said lever adjacent to said cross head, and connections between the traction wheel of the machine and the said cam, whereby the latter will be rotated under the advance movement of the machine, substantially as described.

2. In a machine of the kind described, the combination with a traction wheel, a finger-equipped bar and sickle, of a lever 6 extending from front to rear of the machine and pivoted near its forward end, the forward end of said lever being connected to said sickle, a casing secured to the rear portion of the machine frame and having a grooved cross head seat, a cross head or slide working in the said grooved seat of said casing and loosely connected to the long rear end of said lever, a cam mounted in said casing and operating on the rear end of said lever, and a driving connection from said traction wheel to said cam, whereby said cam will be rotated, said lever vibrated, and said sickle will be reciprocated, under the advance movement of the machine, substantially as described.

3. In a machine of the kind described, the combination with a traction wheel, a finger-equipped bar and a sickle, of a lever of the first class intermediately fulcrumed to the frame of said machine and having its front end pivotally connected to said sickle, a cam having in its face an eccentrically located groove that is a true circle and in which the rear end of said lever is arranged to work, and means for driving said cam from said traction wheel, substantially as described.

In testimony whereof I affix my signature in presence of two witnesses.

HENRY H. KRYGER.

Witnesses:
MALIE HOEL,
F. D. MERCHANT.